United States Patent
Shi et al.

(10) Patent No.: US 9,883,372 B2
(45) Date of Patent: Jan. 30, 2018

(54) METHOD, SUBSCRIBER SERVER AND MOBILITY MANAGEMENT ENTITY FOR DETERMINING SERVING NODE OF SHORT MESSAGE SERVICE

(71) Applicant: Huawei Technologies Co., Ltd., Shenzhen (CN)

(72) Inventors: Shufeng Shi, Xi'an (CN); Yanping Zhang, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 210 days.

(21) Appl. No.: 14/616,495

(22) Filed: Feb. 6, 2015

(65) Prior Publication Data
US 2015/0156622 A1    Jun. 4, 2015

Related U.S. Application Data

(63) Continuation of application No. PCT/CN2013/078809, filed on Jul. 4, 2013.

(30) Foreign Application Priority Data

Aug. 6, 2012 (CN) .......................... 2012 1 0277125

(51) Int. Cl.
H04L 12/66 (2006.01)
H04W 8/02 (2009.01)
(Continued)

(52) U.S. Cl.
CPC .............. *H04W 8/02* (2013.01); *H04W 4/12* (2013.01); *H04W 4/14* (2013.01); *H04W 8/04* (2013.01); *H04W 8/18* (2013.01)

(58) Field of Classification Search
USPC ................... 370/328, 252, 331, 356, 395.52; 455/418, 445, 456.6, 466
See application file for complete search history.

(56) References Cited

U.S. PATENT DOCUMENTS

2010/0202413 A1    8/2010 Vikberg et al.
2011/0116449 A1    5/2011 Hu et al.
(Continued)

FOREIGN PATENT DOCUMENTS

| CN | 101577955 A | 11/2009 |
|---|---|---|
| CN | 101731016 A | 6/2010 |
| WO | 2010073091 A1 | 7/2010 |

OTHER PUBLICATIONS

"3rd Generation Partnership Project; Technical Specification Group Services and System Aspects; Circuit Switched (CS) Fallback in Evolved Packet System (EPS); Stage 2, (Release 11)," 3GPP TS 23.272, V11.1.0, Jun. 2012, 90 pages.
(Continued)

*Primary Examiner* — Phuongchau Ba Nguyen
(74) *Attorney, Agent, or Firm* — Slater Matsil, LLP

(57) ABSTRACT

The present invention provides a method, a subscriber server and a mobility management entity for determining a serving node of a short message service. After receiving a location update request sent by an MME, an HSS/HLR determines services subscribed to by a subscriber. When determining that the subscriber has not subscribed to a CS domain service or there is only an SMS service in CS domain services subscribed to by the subscriber, the HSS/HLR registers the MME as a serving node that provides the SMS service for the subscriber.

15 Claims, 5 Drawing Sheets

(51) Int. Cl.
    *H04W 4/12*     (2009.01)
    *H04W 4/14*     (2009.01)
    *H04W 8/04*     (2009.01)
    *H04W 8/18*     (2009.01)

(56) References Cited

U.S. PATENT DOCUMENTS

| | | |
|---|---|---|
| 2012/0120789 A1 | 5/2012 | Ramachandran et al. |
| 2014/0287752 A1* | 9/2014 | Stojanovski ............ H04W 4/14 455/435.1 |

OTHER PUBLICATIONS

"3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol (Release 10)," 3GPP TS 29.272, V10.6.0, Mar. 2012, 98 pages.

Ericsson et al., "Correction of PS-Only Feature Description," 3GPP TSG SA WG2 Meeting #92, S2-123421, Jul. 9-13, 2012, 4 pages.

\* cited by examiner

METHOD, SUBSCRIBER SERVER AND MOBILITY MANAGEMENT ENTITY FOR DETERMINING SERVING NODE OF SHORT MESSAGE SERVICE

This application is a continuation of International Application No. PCT/CN2013/078809, filed on Jul. 4, 2013, which claims priority to Chinese Patent Application No. 201210277125.X, filed on Aug. 6, 2012, both of which are hereby incorporated by reference in their entireties.

TECHNICAL FIELD

The present invention relates to the field of communications technologies, and in particular, to a method, a subscriber server and a mobility management entity for determining a serving node of a short message service.

BACKGROUND

In a wireless communications system, for example, a Long Term Evolution (LTE) system or a Long Term Evolution Advanced (LTE-Advanced) system, in order to directly provide a subscriber with a short message service (SMS) through an LTE network, the 3rd Generation Partnership Project (3GPP) defines a feature of a mobility management entity (MME) supporting a short message service, namely, an SMS in MME service. With this feature, when a user equipment (UE) initiates a combined attach request or a combined update request that carries SMS only indication information, an MME requests a home subscriber server or home location register (Home Subscriber Server or Home Location Register, HSS/HLR) to register the MME as a node that provides a short message service, and after the MME is registered by the HSS/HLR as the serving node that provides a short message service for a subscriber, the MME is directly connected to a short message service center SMS-SC (service center) or a short message gateway SMS-GMSC (gateway mobile switching center), and provides the short message service for a subscriber through a packet switched (PS) domain, without the need to establish an SGs association with a mobile switching center (MSC) to provide the short message service for a subscriber through a circuit switched (CS) domain.

However, in the prior art, when a combined attach request or a combined update request initiated by a user equipment does not carry SMS only indication information, an MME blindly requests an HSS/HLR to register the MME as a serving node that provides an SMS for a subscriber, which causes extra signaling interaction between the MME and the HSS/HLR when the registration is inaccurate.

SUMMARY

In view of this, a method, a subscriber server and a mobility management entity are provided in a plurality of aspects of the application to solve the following problem: when a combined attach request or a combined update request does not carry SMS only indication information, an MME is unable to determine whether to request an HSS/HLR to register the MME as a serving node that provides an SMS for a subscriber.

According to one aspect of the application, a method for determining a serving node of a short message service is provided, including: receiving a location update request sent by a mobility management entity MME, where the location update request carries a subscriber identity; determining, according to the location update request and the subscriber identity, whether a subscriber has subscribed to a CS domain service or whether an SMS service is the only CS domain service subscribed to by the subscriber; and if the subscriber has not subscribed to the CS domain service or the SMS service is the only CS domain service subscribed to by the subscriber, registering the MME as a serving node that provides the SMS service for the subscriber.

In a first possible implementation manner, the determining, according to the location update request and the subscriber identity, whether a subscriber has subscribed to a CS domain service or whether an SMS service is the only CS domain service subscribed to by the subscriber, includes: determining that the location update request does not carry indication information for registering the MME as the serving node that provides the SMS service for the subscriber, and determining, according to the subscriber identity, whether the subscriber has subscribed to a CS domain service or whether there is only an SMS service in CS services subscribed to by the subscriber; or determining, according to indication information carried in the location update request and indicating that the MME is registered as the serving node that provides the SMS service for the subscriber when the subscriber has not subscribed to the CS domain service or the SMS service is the only CS domain service subscribed to by the subscriber, and the subscriber identity, whether the subscriber has subscribed to a CS domain service or whether an SMS service is the only CS domain service subscribed to by the subscriber; or determining, according to indication information carried in the location update request and indicating that a user equipment has initiated a combined evolved packet system EPS or international mobile subscriber identity IMSI attach request or a combined tracking area TA or location area LA update request, and the subscriber identity, whether the subscriber has subscribed to a CS domain service or whether an SMS service is the only CS domain service subscribed to by the subscriber.

With reference to the first possible implementation manner, in a second possible implementation manner, the location update request further carries routing information used for terminating a short message service, where the indication information is indicated by the routing information used for terminating the short message service.

According to another aspect of the application, a method for determining a serving node of a short message service is provided, including: sending a location update request to a home subscriber server or home location register HSS/HLR, where the location update request carries a subscriber identity, and indication information used to instruct the HSS/HLR to register, when a subscriber has not subscribed to a CS domain service or there is only an SMS service in CS domain services subscribed to by the subscriber, a mobility management entity MME as a serving node that provides the SMS service for the subscriber, so that the HSS/HLR registers, according to the subscriber identity and the indication information, the MME as the serving node that provides the SMS service for the subscriber; and receiving a location update request response returned by the HSS/HLR, where the location update request response carries a registration complete indication, where the registration complete indication is used to notify the MME that the HSS/HLR has registered the MME as the serving node that provides the SMS service for the subscriber.

In a first possible implementation manner, the location update request also carries routing information used for terminating a short message service, where the indication information is indicated by the routing information used for terminating the short message service.

With reference to the first possible implementation manner, in a second implementation manner, before the sending a location update request to a home subscriber server or a home location register HSS/HLR, the method further includes: receiving a combined evolved packet system EPS or international mobile subscriber identity IMSI attach request or a combined tracking area TA or location area LA update request sent by a user equipment, where the combined EPS/IMSI attach request or the combined TA/LA update request does not carry SMS only indication information.

According to another aspect of the application, a subscriber server is provided, including: a receiving module, configured to receive a location update request sent by a mobility management entity MME, where the location update request carries a subscriber identity; a determining module, configured to determine, according to the location update request and the subscriber identity, whether a subscriber has subscribed to a CS domain service or whether there is only an SMS service in CS services subscribed to by the subscriber; and a registering module, configured to register, if the subscriber has not subscribed to the CS domain service or the SMS service is the only CS domain service subscribed to by the subscriber, the MME as a serving node that provides the SMS service for the subscriber.

In a first possible implementation manner, the determining module is specifically configured to determine that the location update request does not carry indication information for registering the MME as the serving node that provides the SMS service for the subscriber, and determine, according to the subscriber identity, whether the subscriber has subscribed to a CS domain service or whether an SMS service is the only CS domain service subscribed to by the subscriber; or determine, according to indication information carried in the location update request and indicating that the MME is registered as the serving node that provides the SMS service for the subscriber when the subscriber has not subscribed to the CS domain service or the SMS service is the only CS domain service subscribed to by the subscriber, and the subscriber identity, whether the subscriber has subscribed to a CS domain service or whether an SMS service is the only CS domain service subscribed to by the subscriber; or determine, according to indication information carried in the location update request and indicating that a user equipment has initiated a combined evolved packet system EPS or international mobile subscriber identity IMSI attach request or a combined tracking area TA or location area LA update request, and the subscriber identity, whether the subscriber has subscribed to a CS domain service or whether an SMS service is the only CS domain service subscribed to by the subscriber.

With reference to the first possible implementation manner, in a second possible implementation manner, the subscriber server further includes: a sending module, configured to return a location update request response to the MME, where the location update request response carries a registration complete indication, where the registration complete indication is used to notify the MME that a home subscriber server or home location register HSS/HLR has registered the MME as the serving node that provides the SMS service for the subscriber.

According to another aspect of the application, a mobility management entity is provided, including: a sending module, configured to send a location update request to a home subscriber server or home location register HSS/HLR, where the location update request carries a subscriber identity, and indication information used to instruct the HSS/HLR to register, when a subscriber has not subscribed to a CS domain service or there is only an SMS service in CS domain services subscribed to by the subscriber, the mobility management entity MME as a serving node that provides the SMS service for the subscriber, so that the HSS/HLR registers, according to the subscriber identity and the indication information, the MME as the serving node that provides the SMS service for the subscriber; and a receiving module, configured to receive a location update request response returned by the HSS/HLR, where the location update request response carries a registration complete indication, where the registration complete indication is used to notify the MME that the HSS/HLR has registered the MME as the serving node that provides the SMS service for the subscriber.

In a first possible implementation manner, the receiving module is further configured to receive a combined evolved packet system EPS or international mobile subscriber identity IMSI attach request or a combined tracking area TA or location area LA update request sent by a user equipment, where the combined EPS/IMSI attach request or the combined TA/LA update request does not carry SMS only indication information.

With reference to the first possible implementation manner, in a second implementation manner, the sending module is further configured to return a combined EPS/IMSI attach request accept or combined TA/LA update request accept response to the user equipment, where the combined EPS/IMSI attach request accept or combined TA/LA update request accept response carries the SMS only indication information.

In the embodiments of the present invention, an HSS/HLR, after receiving a location update request sent by an MME, determines services subscribed to by a subscriber, and when determining that the subscriber has not subscribed to a CS domain service or there is only an SMS service in CS domain services subscribed to by the subscriber, the HSS/HLR registers the MME as a serving node that provides the SMS service for the subscriber. The HSS/HLR determines, according to the services subscribed to by the subscriber, whether to register the MME as the serving node that provides the SMS service for the subscriber, which avoids extra signaling interaction between the MME and the HSS/HLR when the MME blindly requests, without knowing the services subscribed to by the subscriber, the HSS/HLR to register the MME as the serving node that provides the SMS service for the subscriber, and further saves communication resources.

DETAILED DESCRIPTION OF ILLUSTRATIVE EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
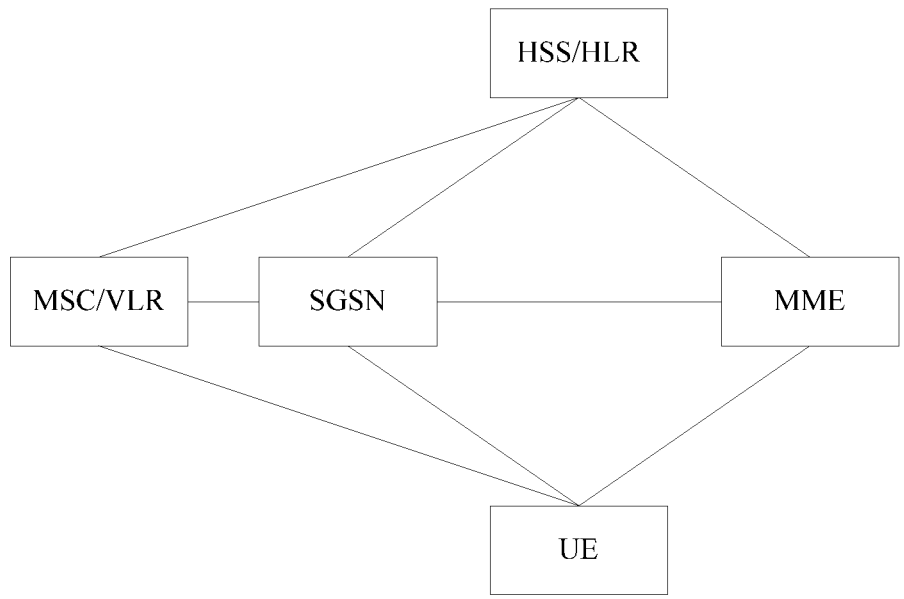
FIG. 1 is a network architecture diagram of an application environment of embodiments of the present invention.

FIG. 1 is a network architecture diagram of an application environment of the embodiments of the present invention. As shown in FIG. 1, the network architecture includes: a mobile switching center or visitor location register (MSC/VLR), a user equipment (UE), a home subscriber server or home location register (HSS/HLR) and a mobility management node (MMN). The MMN includes a mobility management entity (MME) in an evolved universal terrestrial radio access network (E-UTRAN) and a serving GPRS support node (SGSN) in a UMTS terrestrial radio access network (UTRAN).

The HSS/HLR is mainly configured to store subscription data and location information of subscribers; and the MSC/VLR mainly provides circuit switched (CS) domain mobility management and services. When a user equipment moves between a 2G or 3G system and an LTE system, the user equipment needs to perform location registration by means of a routing area update, or location area update, or tracking area update (Routing Area Update, or Location Area Update, or Tracking Area Update, RAU/LAU/TAU).

For an SMS service, the HSS/HLR needs to return, according to registration information of the user equipment on the MSC/VLR, or SGSN, or MME, a correct serving node address, so that a short message can be forwarded to a corresponding serving node and then be sent to the user equipment. In order to enable the user equipment to still use services provided by the CS domain, for example, SMS and voice services in the CS domain, when the user equipment accesses the LTE, the user equipment may initiate a combined evolved packet system EPS or international mobile subscriber identity IMSI attach request, to request registration in both the EPS and the CS domain. Subsequently, during a location update, a combined tracking area TA or location area LA update request will also be initiated, to update both the tracking area in the EPS and the location area in the CS domain. After receiving the combined EPS/IMSI attach request, the MME will establish an SGs association with the MSC/VLR through an SGs interface to support a subsequent SMS service and circuit switched fallback CSFB service, that is, a short message is transferred through the SGs interface and the UE is triggered to access the CS domain to use the CS domain services through the SGs interface.

Figure 2:
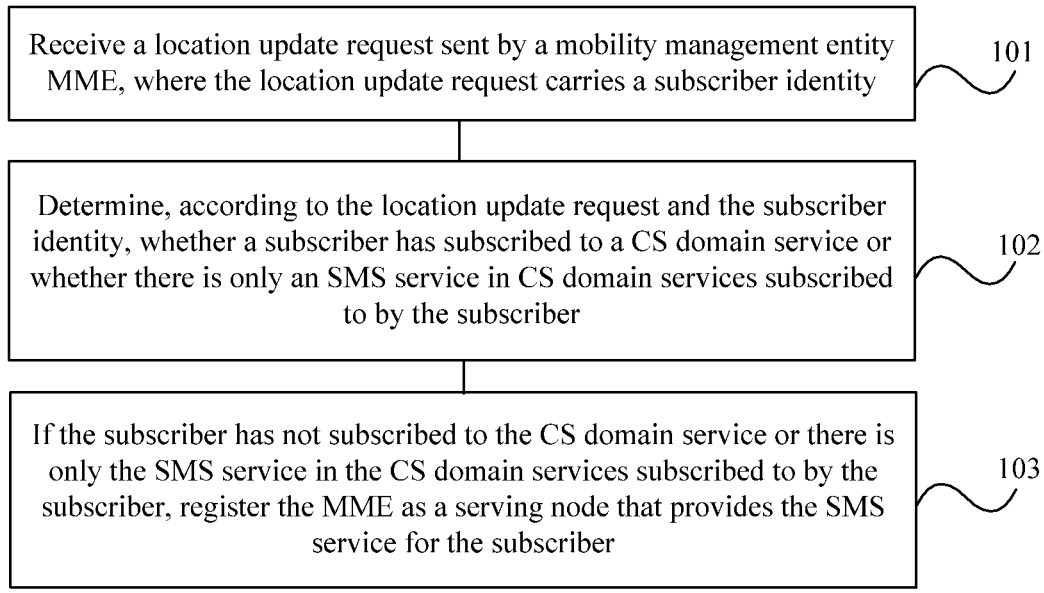
FIG. 2 is a schematic flowchart of one embodiment of a method for determining a serving node of a short message service according to the present invention.

FIG. 2 is a schematic flowchart of one embodiment of a method for determining a serving node of a short message service according to the present invention. In this embodiment of the present invention, as an example, the method may be executed by an HSS/HLR. As shown in FIG. 2, the method includes the following the steps.

Step 101: Receive a location update request sent by a mobility management entity MME, where the location update request carries a subscriber identity.

Step 102: Determine, according to the location update request and the subscriber identity, whether a subscriber has subscribed to a CS domain service or whether an SMS service is the only CS domain service subscribed to by the subscriber.

In this embodiment of the present invention, manners of the determining, according to the location update request and the subscriber identity, whether a subscriber has subscribed to a CS domain service or whether an SMS service is the only CS domain service subscribed to by the subscriber may be one of the following manners.

Manner 1: Determining that the location update request does not carry indication information for registering the MME as a serving node that provides the SMS service for the subscriber, and determining, according to the subscriber identity, whether the subscriber has subscribed to a CS domain service or whether an SMS service is the only CS domain service subscribed to by the subscriber.

Manner 2: Determining, according to indication information carried in the location update request and indicating that the MME is registered as the serving node that provides the SMS service for the subscriber when the subscriber has not subscribed to the CS domain service or the SMS service is the only CS domain service subscribed to by the subscriber, and the subscriber identity, whether the subscriber has subscribed to a CS domain service or whether an SMS service is the only CS domain service subscribed to by the subscriber.

Manner 3: Determining, according to indication information carried in the location update request and indicating that a user equipment has initiated a combined evolved packet system EPS or international mobile subscriber identity IMSI attach request or a combined tracking area TA or location area LA update request, and the subscriber identity, whether the subscriber has subscribed to a CS domain service or whether an SMS service is the only CS domain service subscribed to by the subscriber.

It should also be noted that, in this embodiment of the present invention, the location update request also carries routing information used for terminating a short message service, and the indication information may be indicated by the routing information used for terminating the short message service.

Step 103: If the subscriber has not subscribed to the CS domain service or the SMS service is the only CS domain service subscribed to by the subscriber, register the MME as the serving node that provides the SMS service for the subscriber.

It should be noted that, after a home subscriber server or home location register HSS/HLR registers the MME as the serving node that provides the SMS service for the subscriber, the HSS/HLR further returns a location update request response to the MME, where the location update request response carries a registration complete indication, where the registration complete indication is used to notify the MME that the HSS/HLR has registered the MME as the serving node that provides the SMS service for the subscriber.

In this embodiment of the present invention, because the subscriber has not subscribed to the CS domain service or there is only the SMS service in the CS domain services subscribed to by the subscriber, the MME does not need to establish a connection with a mobile switching center or visitor location register MSC/VLR to provide the CS domain service for the subscriber. That is, when the MME receives a message that it has been registered as the serving node that provides the SMS service for the subscriber, the MME does not need to establish a connection with the MSC/VLR.

In this embodiment of the present invention, after receiving the location update request sent by the MME, the HSS/HLR determines services subscribed to by the subscriber, and when determining that the subscriber has not subscribed to the CS domain service or there is only the SMS service in the CS domain services subscribed to by the subscriber, the HSS/HLR registers the MME as the serving node that provides the SMS service for the subscriber. The HSS/HLR determines, according to the services subscribed to by the subscriber, whether to register the MME as the serving node that provides the SMS service for the subscriber, which avoids extra signaling interaction between the MME and the HSS/HLR when the MME blindly requests, without knowing the services subscribed to by the subscriber, the HSS/HLR to register the MME as the serving node that provides the SMS service for the subscriber, and further saves communication resources.

Figure 3:
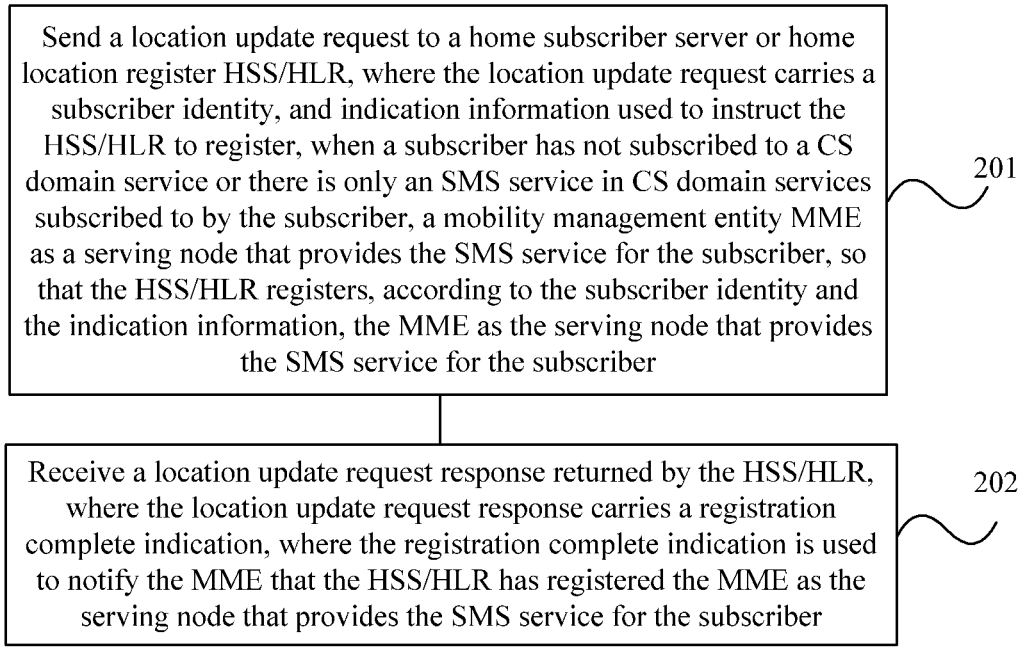
FIG. 3 is a schematic flowchart of another embodiment of the method for determining a serving node of a short message service according to the present invention.

FIG. 3 is a schematic flowchart of another embodiment of the method for determining a serving node of a short message service according to the present invention. In this embodiment of the present invention, as an example, the method may be executed by an MME. As shown in FIG. 3, the method includes the following the steps.

Step 201: Send a location update request to a home subscriber server or home location register HSS/HLR, where the location update request carries a subscriber identity, and indication information used to instruct the HSS/HLR to register, when a subscriber has not subscribed to a CS domain service or there is only an SMS service in CS domain services subscribed to by the subscriber, a mobility management entity MME as a serving node that provides the SMS service for the subscriber, so that the HSS/HLR registers, according to the subscriber identity and the indication information, the MME as the serving node that provides the SMS service for the subscriber.

It should also be noted that, in this embodiment of the present invention, when the location update request carries routing information used for terminating a short message service, the indication information may be indicated by the routing information used for terminating the short message service.

It should be further noted that, before the sending a location update request to a home subscriber server or home location register HSS/HLR, the method further includes: receiving a combined evolved packet system EPS or international mobile subscriber identity IMSI attach request or a combined tracking area TA or location area LA update request sent by a user equipment, where the combined EPS/IMSI attach request or the combined TA/LA update request does not carry SMS only indication information.

Step 202: Receive a location update request response returned by the HSS/HLR, where the location update request response carries a registration complete indication, where the registration complete indication is used to notify the MME that the HSS/HLR has registered the MME as the serving node that provides the SMS service for the subscriber.

It should be noted that, after the receiving a location update request response returned by the HSS/HLR, the method further includes: returning a combined EPS/IMSI attach request accept or combined TA/LA update request accept response to the user equipment, where the combined EPS/IMSI attach request accept or combined TA or LA update request accept response carries the SMS only indication information.

In this embodiment of the present invention, the MME sends the location update request to the HSS/HLR, where the location update request carries the subscriber identity, and indication information used to instruct the HSS/HLR to register, when the subscriber has not subscribed to the CS domain service or there is only the SMS service in the CS domain services subscribed to by the subscriber, the mobility management entity MME as the serving node that provides the SMS service for the subscriber, so that the HSS/HLR registers, according to the subscriber identity and the indication information, the MME as the serving node that provides the SMS service for the subscriber. This avoids extra signaling interaction between the MME and the HSS/HLR when the MME blindly requests, without knowing the services subscribed to by the subscriber, the HSS/HLR to register the MME as the serving node that provides the SMS service for the subscriber, and further saves communication resources.

Figure 4:
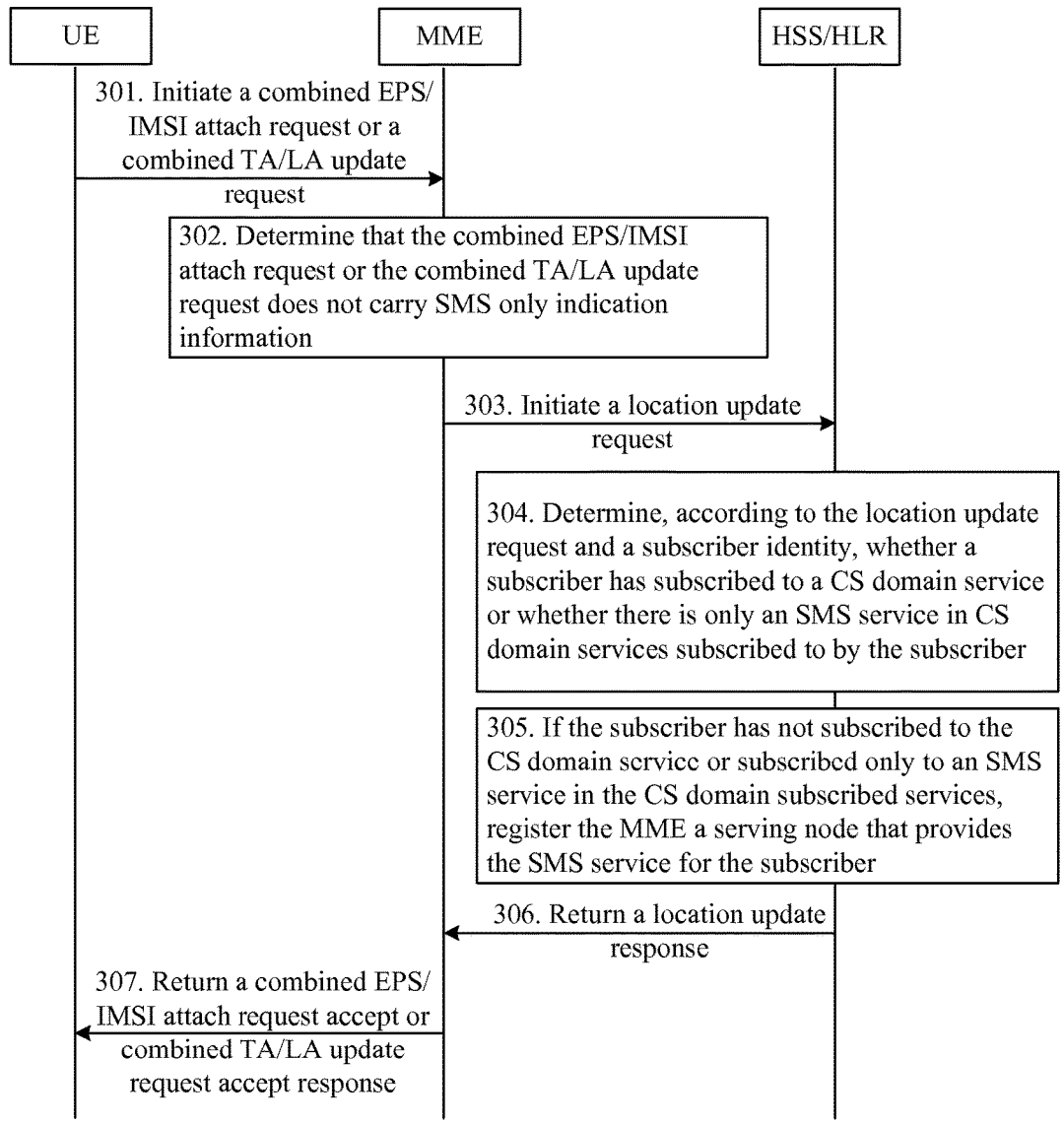
FIG. 4 is a schematic flowchart of another embodiment of the method for determining a serving node of a short message service according to the present invention.

FIG. 4 is a schematic flowchart of another embodiment of the method for determining a serving node of a short message service according to the present invention. In this embodiment of the present invention, the technical solution of the present invention is described by using an example in which an SGs interface exists between a mobility management entity MME and a mobile switching center or visitor location register MSC/VLR, that is, the MME supports a circuit switched fallback CSFB service. As shown in FIG. 4, the method includes the following the steps.

Step 301: A UE initiates a combined EPS/IMSI attach request or a combined TA/LA update request to an MME, where the combined EPS/IMSI attach request or the combined TA/LA update request carries a subscriber identity.

Step 302: The MME determines that the combined EPS/IMSI attach request or the combined TA/LA update request does not carry SMS only indication information.

Step 303: The MME initiates a location update request to an HSS/HLR, where the location update request carries the subscriber identity.

In this embodiment of the present invention, the location update request initiated by the MME may also carry indication information used to instruct the HSS/HLR to register, when a subscriber has not subscribed to a CS domain service or there is only an SMS service in CS domain services subscribed to by the subscriber, the mobility management entity MME as a serving node that provides the SMS service for the subscriber.

The indication information may be indication information that, when the location update request of the MME does not carry an indication of registering the MME as the serving node that provides the SMS service for the subscriber, the HSS/HLR determines whether the subscriber has subscribed to a CS domain service or whether an SMS service is the only CS domain service subscribed to by the subscriber, and when the subscriber has not subscribed to the CS domain service or the SMS service is the only CS domain service subscribed to by the subscriber, the HSS/HLR registers the MME as the serving node that provides the SMS service for the subscriber.

In addition, the indication information may also be indication information carried in the location update request and indicating that the MME is registered as the serving node that provides the SMS service for the subscriber when the subscriber has not subscribed to the CS domain service or the SMS service is the only CS domain service subscribed to by the subscriber, or indication information carried in the location update request and indicating that when a user equipment has initiated a combined evolved packet system EPS or international mobile subscriber identity IMSI attach request or a combined tracking area TA or location area LA update request, the HSS/HLR determines whether the subscriber has subscribed to a CS domain service or whether an SMS service is the only CS domain service subscribed to by the subscriber, and when the subscriber has not subscribed to the CS domain service or the SMS service is the only CS domain service subscribed to by the subscriber, the HSS/HLR registers the MME as the serving node that provides the SMS service for the subscriber.

It should be noted that, the location update request initiated by the MME to the HSS/HLR may also carry routing information used for terminating a short message service, where the routing information may be a number coded based on E.164.

Step 304: The HSS/HLR determines, according to the location update request and the subscriber identity, whether the subscriber has subscribed to a CS domain service or whether an SMS service is the only CS domain service subscribed to by the subscriber.

In this embodiment of the present invention, the HSS/HLR queries, according to the subscriber identity carried in the location update request, subscription data of the subscriber, and determines, according to the subscription data of the subscriber, whether the subscriber has subscribed to a CS domain service or whether an SMS service is the only CS domain service subscribed to by the subscriber.

Specifically, the manners in which the HSS/HLR determines, according to the location update request and the subscriber identity, whether the subscriber has subscribed to a CS domain service or whether an SMS service is the only CS domain service subscribed to by the subscriber include but are not limited to the following manners.

In a first manner (Manner 1), when the location update request sent by the MME does not carry the indication information for registering the MME as the serving node that provides the SMS service for the subscriber, the HSS/HLR needs to determine whether the subscriber has subscribed to a CS domain service or whether an SMS service is the only CS domain service subscribed to by the subscriber.

For example, after receiving the location update request message sent by the MME, the HSS/HLR determines that the location update request does not carry the indication information for registering the MME as the serving node that provides the SMS service for the subscriber, and then, the HSS/HLR may query, according to the subscriber identity, subscription data of the subscriber, and determine whether the subscriber has subscribed to a CS domain service or whether an SMS service is the only CS domain service subscribed to by the subscriber.

In a second manner (Manner 2), when the location update request sent by the MME carries the indication information for registering, when the subscriber has not subscribed to the CS domain service or the SMS service is the only CS domain service subscribed to by the subscriber, the MME as the serving node that provides the SMS service for the subscriber, the HSS/HLR needs to determine whether the subscriber has subscribed to a CS domain service or whether an SMS service is the only CS domain service subscribed to by the subscriber.

For example, after receiving the location update request sent by the MME, the HSS/HLR may query, according to the indication information carried in the location update request and indicating that the MME is registered as the serving node that provides the SMS service for the subscriber when the subscriber has not subscribed to the CS domain service or the SMS service is the only CS domain service subscribed to by the subscriber, and the subscriber identity, subscription data of the subscriber to determine whether the subscriber has subscribed to a CS domain service or whether an SMS service is the only CS domain service subscribed to by the subscriber.

It should be noted that manner 1 and manner 2 are applicable not only to a scenario in which a UE initiates a combined EPS/IMSI attach request or a combined TA/LA update request, but also to a scenario in which the UE has initiated a common EPS attach request or TA update request and an HSS/HLR determines whether to register an MME as a serving node that provides a short message service for a subscriber.

In a third manner (Manner 3), when the location update request sent by the MME carries indication information that the user equipment has initiated a combined evolved packet system EPS or international mobile subscriber identity IMSI attach request or a combined tracking area TA or location area LA update request, the HSS/HLR needs to determine whether the subscriber has subscribed to a CS domain service or whether there is only an SMS service in CS services subscribed to by the subscriber.

For example, after receiving the location update request message sent by the MME, the HSS/HLR queries, according to the indication information carried in the location update request and indicating that the user equipment has initiated a combined evolved packet system EPS or international mobile identity IMSI attach request or a combine tracking area TA or location area LA update request, and the subscriber identity, subscription data of the subscriber, and determines whether the subscriber has subscribed to a CS domain service or whether an SMS service is the only CS domain service subscribed to by the subscriber.

It should be further noted that, in this embodiment of the present invention, the foregoing indication information may be indicated by routing information carried in the location update request initiated by the MME to the HSS/HLR and used for terminating a short message service.

Step 305: If the subscriber has not subscribed to the CS domain service or subscribed only to an SMS service in the CS domain subscribed services, the HSS/HLR decides to register the MME as the serving node that provides the SMS service for the subscriber.

In this embodiment of the present invention, when the HSS/HLR determines that the subscriber has not subscribed to the CS domain service or subscribed only to the SMS service in the CS domain subscribed services, the HSS/HLR decides to register the MME as the serving node that provides the SMS service for the subscriber. This prevents the MME from notifying, without determining the services subscribed to by the subscriber, the HSS/HLR to register the MME as the serving node that provides the SMS service for the subscriber, which causes extra signaling interaction between the MME and the HSS/HLR and wastes communication resources because when the MME receives subscription data delivered by the HSS/HLR and finds that the subscriber has subscribed to a CS domain service, the MME establishes an SGs association with the MSC/VLR whereas the HSS/HLR needs to cancel the registration of the MME as the serving node that provides the SMS service for the subscriber.

Step 306: The HSS/HLR returns a location update response to the MME, notifying the MME that the MME has been registered as the serving node that provides the SMS service for the subscriber.

Step 307: The MME returns a combined EPS/IMSI attach request accept or combined TA/LA update request accept response to the UE, where the combined EPS/IMSI attach request accept or combined TA/LA update request accept response carries an SMS only indication.

In this embodiment of the present invention, after receiving the notification that the HSS/HLR has registered the MME as the serving node that provides the SMS service for the subscriber, the MME does not establish a connection with the MSC/VLR, but returns the combined EPS/IMSI attach request accept or combined TA/LA update request accept response to the UE, where the combined EPS/IMSI attach request accept or combined TA/LA update request accept response carries the SMS only indication, so as to confirm that the SMS service and other non-CS domain subscribed services are provided for the UE through the MME.

In this embodiment of the present invention, after receiving the location update request sent by the MME, according to the location update request that does not carry the indication information for registering the MME as the serving node that provides the SMS service for the subscriber, or according to the indication information carried in the location update request and indicating that the MME is registered as the serving node that provides the SMS service for the subscriber when the subscriber has not subscribed to the CS domain service or the SMS service is the only CS domain service subscribed to by the subscriber, or according to the indicating information carried in the location update request and indicating that the user equipment has initiated a combined evolved packet system EPS or international mobile identity IMSI attach request or a combine tracking area TA or location area LA update request, and the subscriber identity, the HSS/HLR determines whether the subscriber has subscribed to a CS domain service or whether an SMS service is the only CS domain service subscribed to by the subscriber, and when determining that the subscriber has not subscribed to the CS domain service or there is only the SMS service in the CS domain services subscribed to by the subscriber, the HSS/HLR registers the MME as the serving node that provides the SMS service for the subscriber.

The HSS/HLR determines, according to an indication of the MME, the services subscribed to by the subscriber, and determines whether to register the MME as the serving node that provides the SMS service for the subscriber, which avoids extra signaling interaction between the MME and the HSS/HLR when the MME blindly requests, without knowing the services subscribed to by the subscriber, the HSS/HLR to register the MME as the serving node that provides the SMS service for the subscriber, and further saves communication resources.

It should be noted that, in this embodiment of the present invention, when the combined EPS/IMSI attach request or combined TA/LA update request initiated by the UE carries the SMS only indication or when the MME does not support the CSFB service or the SGs interface, the MME clearly instructs the HSS/HLR to register the MME as the serving node that provides the SMS service for the subscriber, and the HSS/HLR no longer needs to determine CS domain service subscription status of the subscriber, but directly registers the MME as the serving node that provides the SMS service for the subscriber.

Figure 5:
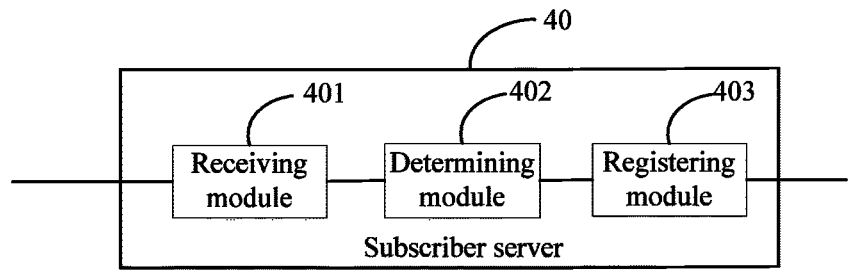
FIG. 5 is a schematic structural diagram of one embodiment of a subscriber server according to the present invention.

FIG. 5 is a schematic structural diagram of one embodiment of a subscriber server according to the present invention. As shown in FIG. 5, the subscriber server 40 includes a receiving module 401, a determining module 402 and a registering module 403.

The receiving module 401 is configured to receive a location update request sent by a mobility management entity MME, where the location update request carries a subscriber identity.

The determining module 402 is configured to determine, according to the location update request and the subscriber identity, whether a subscriber has subscribed to a CS domain service or whether an SMS service is the only CS domain service subscribed to by the subscriber.

The registering module 403 is configured to, if the subscriber has not subscribed to the CS domain service or the SMS service is the only CS domain service subscribed to by the subscriber, register the MME as a serving node that provides the SMS service for the subscriber.

In this embodiment of the present invention, after receiving the location update request sent by the MME, the subscriber server determines the services subscribed to by the subscriber, and when determining that the subscriber has not subscribed to the CS domain service or the SMS service is the only CS domain service subscribed to by the subscriber, the subscriber server registers the MME as the serving node that provides the SMS service for the subscriber. The subscriber server determines, according to the services subscribed to by the subscriber, whether to register the MME as the serving node that provides the SMS service for the subscriber, which avoids extra signaling interaction between the MME and the subscriber server when the MME blindly requests, without knowing the services subscribed to by the subscriber, the subscriber server to register the MME as the serving node that provides the SMS service for the subscriber, and further saves communication resources.

It should be noted that, in this embodiment of the present invention, the determining module 402 may further be specifically configured to: determine that the location update request does not carry indication information for registering the MME as the serving node that provides the SMS service for the subscriber, and determine, according to the subscriber identity, whether the subscriber has subscribed to a CS domain service or whether an SMS service is the only CS domain service subscribed to by the subscriber; or determine, according to indication information carried in the location update request and indicating that the MME is registered as the serving node that provides the SMS service for the subscriber when the subscriber has not subscribed to the CS domain service or the SMS service is the only CS domain service subscribed to by the subscriber, and the subscriber identity, whether the subscriber has subscribed to a CS domain service or whether an SMS service is the only CS domain service subscribed to by the subscriber; or determine, according to indication information carried in the location update request and indicating that a user equipment has initiated a combined evolved packet system EPS or international mobile subscriber identity IMSI attach request or a combined tracking area TA or location area LA update request, and the subscriber identity, whether the subscriber has subscribed to a CS domain service or whether an SMS service is the only CS domain service subscribed to by the subscriber.

Figure 6:
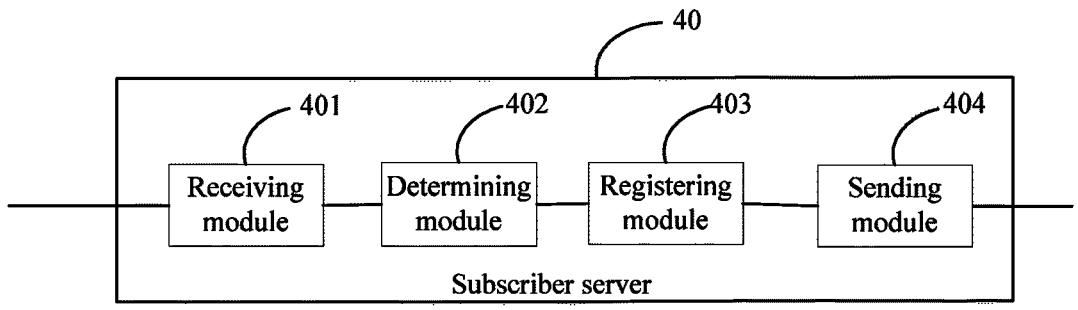
FIG. 6 is a schematic structural diagram of another embodiment of the subscriber server according to the present invention.

In addition, as shown in FIG. 6, the subscriber server 40 may further include a sending module 404. The sending module 404 is configured to return a location update request response to the MME, where the location update request response carries a registration complete indication, where the registration complete indication is used to notify the MME that a home subscriber server or home location register HSS/HLR has registered the MME as the serving node that provides the SMS service for the subscriber.

Figure 7:
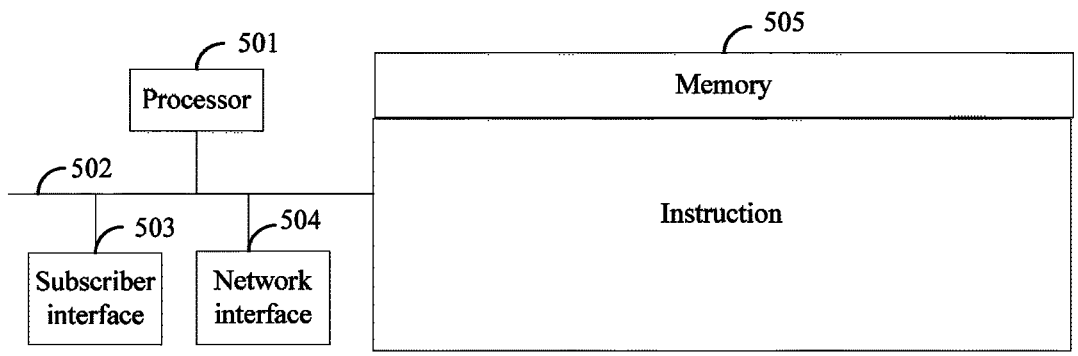
FIG. 7 is a schematic structural diagram of another embodiment of the subscriber server according to the present invention.

FIG. 7 is a schematic structural diagram of another embodiment of the subscriber server according to the present invention.

As shown in FIG. 7, the subscriber server includes at least one processor 501, at least one network interface 504, a memory 505, at least one communication bus 502 and a subscriber interface 503.

The communication bus 502 is configured to implement connection and communication between the foregoing components; and the subscriber interface 503 is configured to implement interaction with a subscriber.

The memory 505 stores instructions to enable the processor 501 to execute the following process: receiving a location update request sent by a mobility management entity MME, where the location update request carries a subscriber identity; determining, according to the location update request and the subscriber identity, whether the subscriber has subscribed to a CS domain service or whether an SMS service is the only CS domain service subscribed to by the subscriber; and if the subscriber has not subscribed to the CS domain service or the SMS service is the only CS domain service subscribed to by the subscriber, registering the MME as a serving node that provides the SMS service for the subscriber.

In this embodiment of the present invention, after receiving the location update request sent by the MME, the subscriber server determines the services subscribed to by the subscriber, and when determining that the subscriber has not subscribed to the CS domain service or the SMS service is the only CS domain service subscribed to by the subscriber, the subscriber server registers the MME as the serving node that provides the SMS service for the subscriber. The subscriber server determines, according to the services subscribed to by the subscriber, whether to register the MME as the serving node that provides the SMS service for the subscriber, which avoids extra signaling interaction between the MME and the subscriber server when the MME blindly requests, without knowing the services subscribed to by the subscriber, the subscriber server to register the MME as the serving node that provides the SMS service for the subscriber, and further saves communication resources.

It should be noted that, in this embodiment of the present invention, the processor 501 may further execute the following operations: determining that the location update request does not carry indication information for registering the MME as the serving node that provides the SMS service for the subscriber, and determining, according to the subscriber identity, whether the subscriber has subscribed to a CS domain service or whether an SMS service is the only CS domain service subscribed to by the subscriber; or determining, according to indication information carried in the location update request and indicating that the MME is registered as the serving node that provides the SMS service for the subscriber when the subscriber has not subscribed to the CS domain service or the SMS service is the only CS domain service subscribed to by the subscriber, and the subscriber identity, whether the subscriber has subscribed to a CS domain service or whether an SMS service is the only CS domain service subscribed to by the subscriber; or determining, according to indication information carried in the location update request and indicating that a user equipment has initiated a combined evolved packet system EPS or international mobile subscriber identity IMSI attach request or a combined tracking area TA or location area LA update request, and the subscriber identity, whether the subscriber has subscribed to a CS domain service or whether an SMS service is the only CS domain service subscribed to by the subscriber.

Figure 8:
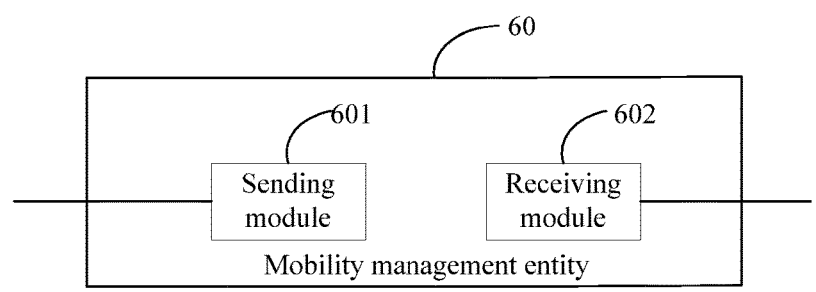
FIG. 8 is a schematic structural diagram of one embodiment of a mobility management entity according to the present invention.

FIG. 8 is a schematic structural diagram of one embodiment of a mobility management entity according to the present invention. As shown in FIG. 8, a mobility management entity 60 includes a sending module 60 and a receiving module 602.

The sending module 601 is configured to send a location update request to a home subscriber server or home location register HSS/HLR, where the location update request carries a subscriber identity and indication information used to instruct the HSS/HLR to register, when a subscriber has not subscribed to a CS domain service or there is only an SMS service in CS domain services subscribed to by the subscriber, the mobility management entity MME as a serving node that provides the SMS service for the subscriber, so that the HSS/HLR registers, according to the subscriber identity and the indication information, the MME as the serving node that provides the SMS service for the subscriber.

The receiving module 602 is configured to receive a location update request response returned by the HSS/HLR, where the location update request response carries a registration complete indication, where the registration complete indication is used to notify the MME that the HSS/HLR has registered the MME as the serving node that provides the SMS service for the subscriber.

In this embodiment of the present invention, the mobility management entity MME sends a location update request to an HSS/HLR, where the location update request carries a subscriber identity, and indication information used to instruct the HSS/HLR to register, when a subscriber has not subscribed to a CS domain service or there is only an SMS service in CS domain services subscribed to by the subscriber, the mobility management entity MME as a serving node that provides the SMS service for the subscriber, so that the HSS/HLR registers, according to the subscriber identity and the indication information, the MME as the serving node that provides the SMS service for the subscriber. This avoids extra signaling interaction between the MME and the HSS/HLR when the MME blindly requests, without knowing the services subscribed to by the subscriber, the HSS/HLR to register the MME as the serving node that provides the SMS service for the subscriber, and further saves communication resources.

It should be noted that, in this embodiment of the present invention, the receiving module 602 may further be configured to receive a combined evolved packet system EPS or international mobile subscriber identity IMSI attach request or a combined tracking area TA or location area LA update request sent by the user equipment, where the combined EPS/IMSI attach request or the combined TA/LA update request does not carry SMS only indication information.

In addition, the sending module 601 may further be configured to return a combined EPS/IMSI attach request accept or combined TA/LA update request accept response to the user equipment, where the combined EPS/IMSI attach request accept or combined TA/LA update request accept response carries the SMS only indication information.

Figure 9:
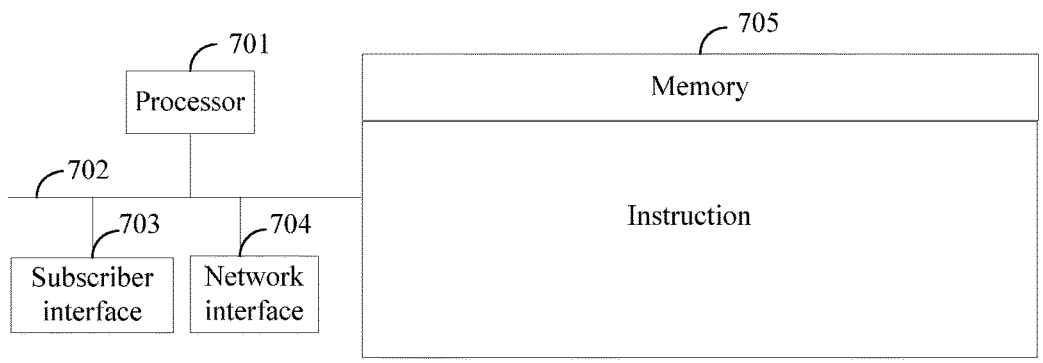
FIG. 9 is a schematic structural diagram of another embodiment of the mobility management entity according to the present invention.

FIG. 9 is a schematic structural diagram of another embodiment of the mobility management entity according to the present invention. As shown in FIG. 9, the mobility management entity includes at least one processor 701, at least one network interface 704, a memory 705, at least one communication bus 702 and a subscriber interface 703.

The communication bus 702 is configured to implement connection and communication between the foregoing components; and the subscriber interface 703 is configured to implement interaction with a subscriber.

The memory 505 stores instructions to enable the processor 501 to execute the following process: sending a location update request to a home subscriber server or home location register HSS/HLR, where the location update request carries a subscriber identity and indication information used to instruct the HSS/HLR to register, when a subscriber has not subscribed to a CS domain service or there is only an SMS service in CS domain services subscribed to by the subscriber, the mobility management entity MME as a serving node that provides the SMS service for the subscriber, so that the HSS/HLR registers, according to the subscriber identity and the indication information, the MME as the serving node that provides the SMS service for the subscriber; and receiving a location update request response returned by the HSS/HLR, where the location update request response carries a registration complete indication, where the registration complete indication is used to notify the MME that the HSS/HLR has registered the MME as the serving node that provides the SMS service for the subscriber.

In this embodiment of the present invention, the mobility management entity MME sends a location update request to an HSS/HLR, where the location update request carries a subscriber identity, and indication information used to instruct the HSS/HLR to register, when a subscriber has not subscribed to a CS domain service or there is only an SMS service in CS domain services subscribed to by the subscriber, the mobility management entity MME as a serving node that provides the SMS service for the subscriber, so that the HSS/HLR registers, according to the subscriber identity and the indication information, the MME as the serving node that provides the SMS service for the subscriber. This avoids extra signaling interaction between the MME and the HSS/HLR when the MME blindly requests, without knowing the services subscribed to by the subscriber, the HSS/HLR to register the MME as the serving node that provides the SMS service for the subscriber, and further saves communication resources.

It should be noted that, in this embodiment of the present invention, the processor 701 may further execute the operation of receiving a combined evolved packet system EPS or international mobile subscriber identity IMSI attach request or a combined tracking area TA or location area LA update request sent by a user equipment, where the combined EPS/IMSI attach request or the combined TA/LA update request does not carry SMS only indication information.

In addition, the processor 701 may further execute the operation of returning a combined EPS/IMSI attach request accept or combined TA/LA update request accept response to the user equipment, where the combined EPS/IMSI attach request accept or combined TA/LA update request accept response carries the SMS only indication information.

A person of ordinary skill in the art may be aware that, in combination with the examples described in the embodiments disclosed in this specification, modules, units, and steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, module, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the apparatuses, modules, or units may be implemented in electronic, mechanical, or other forms.

The modules or units described as separate parts may or may not be physically separate, and parts displayed as modules or units may or may not be physical modules or units, may be located in one position, or may be distributed on a plurality of network modules or units. A part or all of the modules or units may be selected according to actual needs to achieve the objectives of the solutions of the embodiments.

In addition, functional modules or units in the embodiments of the present invention may be integrated into one processing module or unit, or each of the modules or units may exist alone physically, or two or more modules or units are integrated into one module or unit. The integrated module or unit may be implemented in a form of hardware, or may be implemented in a form of a software functional unit.

When the integrated module or unit is implemented in the form of a software functional module or unit and sold or used as an independent product, the integrated module or unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for determining a serving node of a short message service, the method comprising:
   receiving a location update request sent by a mobility management entity (MME), wherein the location update request carries a subscriber identity, and wherein the location update request does not carry indication information for registering the MME as a serving node that provides a short message service (SMS) service for a subscriber;
   determining, according to the location update request, the subscriber identity, and stored subscription information regarding the subscriber identity, whether the subscriber has subscribed to a circuit switched (CS) domain service or whether the SMS service is the only CS domain service subscribed to by the subscriber; and
   in response to determining that the subscriber has not subscribed to the CS domain service or the SMS service is the only CS domain service subscribed to by the subscriber, registering the MME as the serving node that provides the SMS service for the subscriber.

2. The method according to claim 1, wherein the determining comprises determining that the location update request does not carry indication information for registering the MME as the serving node that provides the SMS service for the subscriber, and determining, according to the subscriber identity and the stored subscription information regarding the subscriber identity, whether the subscriber has subscribed to a CS domain service or whether an SMS service is the only CS domain service subscribed to by the subscriber.

3. The method according to claim 1, wherein the determining comprises determining, according to indication information carried in the location update request and indicating that a user equipment has initiated a combined evolved packet system (EPS) or international mobile subscriber identity (IMSI) attach request or a combined tracking area (TA) or location area (LA) update request, and the subscriber identity and the stored subscription information regarding the subscriber identity, whether the subscriber has subscribed to a CS domain service or whether an SMS service is the only CS domain service subscribed to by the subscriber.

4. The method according to claim 1, further comprising returning a location update request response to the MME, wherein the location update request response carries a registration complete indication, wherein the registration complete indication is used to notify the MME that a home subscriber server or home location register HSS/HLR has registered the MME as a serving node that provides the SMS service for the subscriber.

5. The method according to claim 1, wherein the determining comprises determining that the subscriber has subscribed to a circuit switched (CS) domain service or that a short message service (SMS) service is the only CS domain service subscribed to by the subscriber.

6. The method according to claim 5, wherein the determining comprises determining that the location update request does not carry indication information for registering the MME as the serving node that provides the SMS service for the subscriber, and determining, according to the subscriber identity and the stored subscription information regarding the subscriber identity, that the subscriber has subscribed to a CS domain service or that an SMS service is the only CS domain service subscribed to by the subscriber.

7. The method according to claim 5, wherein the determining comprises determining, according to indication information carried in the location update request and indicating that a user equipment has initiated a combined evolved packet system (EPS) or international mobile subscriber identity (IMSI) attach request or a combined tracking area (TA) or location area (LA) update request, and the subscriber identity and the stored subscription information regarding the subscriber identity, that the subscriber has subscribed to a CS domain service or that an SMS service is the only CS domain service subscribed to by the subscriber.

8. The method according to claim 5, further comprising returning a location update request response to the MME, wherein the location update request response carries a registration complete indication, wherein the registration complete indication is used to notify the MME that a home subscriber server or home location register HSS/HLR has registered the MME as a serving node that provides the SMS service for the subscriber.

9. A method for determining a serving node of a short message service, the method comprising:
   receiving a combined evolved packet system (EPS) or international mobile subscriber identity (IMSI) attach request or a combined tracking area (TA) or location area (LA) update request sent by a user equipment, wherein the combined EPS/IMSI attach request or the combined TA/LA update request does not carry SMS only indication information;
   in response to determining that the combined EPS/IMSI attach request or the combined TA/LA update request does not carry SMS only indication information, sending a location update request to a home subscriber server or home location register HSS/HLR, wherein the location update request carries a subscriber identity and indication information used to instruct the HSS/HLR to register, when a subscriber has not subscribed to a CS domain service or there is only a short message service (SMS) service in CS domain services subscribed to by the subscriber, a mobility management entity MME as a serving node that provides the SMS service for the subscriber, so that the HSS/HLR registers, according to the subscriber identity and the indication information, the MME as the serving node that provides the SMS service for the subscriber; and
   receiving a location update request response returned by the HSS/HLR, wherein the location update request response carries a registration complete indication, wherein the registration complete indication is used to notify the MME that the HSS/HLR has registered the MME as the serving node that provides the SMS service for the subscriber.

10. The method according to claim 9, wherein the location update request further carries routing information used for terminating a short message service, wherein the indication information is indicated by the routing information used for terminating the short message service.

11. The method according to claim 10, wherein, after the receiving a location update request response returned by the HSS/HLR, the method further comprises returning a combined EPS/IMSI attach request accept or combined TA/LA update request accept response to the user equipment, wherein the combined EPS/IMSI attach request accept or combined TA/LA update request accept response carries the SMS only indication information.

12. A subscriber server, comprising:
a processor; and
a non-transitory computer-readable storage medium storing a program to be executed by the processor, the program including instructions for:
receiving a location update request sent by a mobility management entity (MME), wherein the location update request carries a subscriber identity, and wherein the location update request does not carry indication information for registering the MME as a serving node that provides a short message service (SMS) service for a subscriber;
determining, according to the location update request, the subscriber identity, and stored subscription information regarding the subscriber identity, whether the subscriber has subscribed to a CS domain service or whether the SMS service is the only CS domain service subscribed to by the subscriber; and
in response to determining that the subscriber has not subscribed to the CS domain service or the SMS service is the only CS domain service subscribed to by the subscriber, registering the MME as a serving node that provides the SMS service for the subscriber.

13. The subscriber server according to claim 12, wherein the determining comprises determining that the location update request does not carry indication information for registering the MME as the serving node that provides the SMS service for the subscriber, and determining, according to the subscriber identity and the stored subscription information regarding the subscriber identity, whether the subscriber has subscribed to a CS domain service or whether an SMS service is the only CS domain service subscribed to by the subscriber.

14. The subscriber server according to claim 12, wherein the determining comprises determining, according to indication information carried in the location update request and indicating that a user equipment has initiated a combined evolved packet system EPS or international mobile subscriber identity IMSI attach request or a combined tracking area TA or location area LA update request, and the subscriber identity and the stored subscription information regarding the subscriber identity, whether the subscriber has subscribed to a CS domain service or whether an SMS service is the only CS domain service subscribed to by the subscriber.

15. The subscriber server according to claim 12, wherein the program includes further instructions for returning a location update request response to the MME, wherein the location update request response carries a registration complete indication, wherein the registration complete indication is used to notify the MME that a home subscriber server or home location register HSS/HLR has registered the MME as the serving node that provides the SMS service for the subscriber.

* * * * *